(12) United States Patent
Kuribayashi et al.

(10) Patent No.: US 12,313,644 B2
(45) Date of Patent: May 27, 2025

(54) DISPENSING DEVICE AND DISPENSING METHOD

(71) Applicant: SEIKO EPSON CORPORATION, Tokyo (JP)

(72) Inventors: Homare Kuribayashi, Ikeda (JP); Masato Hanamura, Shiojiri (JP); Koki Yamakawa, Chino (JP); Koji Imamura, Shiojiri (JP); Hiroyuki Kanai, Shiojiri (JP); Makihito Hori, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 342 days.

(21) Appl. No.: 18/100,002

(22) Filed: Jan. 23, 2023

(65) Prior Publication Data
US 2023/0236214 A1 Jul. 27, 2023

(30) Foreign Application Priority Data
Jan. 24, 2022 (JP) .................................. 2022-008424

(51) Int. Cl.
*G01N 35/10* (2006.01)
*G01G 15/02* (2006.01)

(52) U.S. Cl.
CPC ... *G01N 35/1016* (2013.01); *G01G 2015/022* (2013.01)

(58) Field of Classification Search
CPC .......... G01N 35/1016; G01N 35/0099; G01G 2015/022; G01G 17/06; G01G 2015/027
USPC ........... 73/149, 863, 863.01, 863.02, 864.11, 73/864.31; 422/501, 502, 509, 521; 222/1, 52, 56, 77
See application file for complete search history.

(56) References Cited

U.S. PATENT DOCUMENTS

2016/0236189 A1 8/2016 Izumo et al.

FOREIGN PATENT DOCUMENTS

WO 2015/071956 A1 5/2015

*Primary Examiner* — Robert R Raevis
(74) *Attorney, Agent, or Firm* — Harness, Dickey & Pierce, P.L.C.

(57) ABSTRACT

A dispensing device that dispenses a liquid sample with a target weight x (in grams) includes: a pipette that discharges the liquid sample into a vessel; and a controller that controls the pipette. The controller performs: first liquid discharge processing in which the controller discharges the liquid sample with a volume of $(x/\rho 0 \times y)$ milliliters (mL) into the pipette, where y is a numeric value greater than 0 and smaller than 1, and $\rho 0$ is the tentative density (in grams per mL) of the liquid sample; first weight acquisition processing in which the controller acquires information about the weight z (in grams) of the liquid sample discharged in first liquid discharge processing; density calculation processing in which the controller calculates the density $\rho$ (in grams/mL) of the liquid sample according to the expression $\rho = z/(x/\rho 0 \times y)$; and second liquid discharge processing in which the controller discharges, into the pipette, the liquid sample with a volume based on the density $\rho$, weight z, and target weight x.

11 Claims, 2 Drawing Sheets

DISPENSING DEVICE AND DISPENSING METHOD

The present application is based on, and claims priority from JP Application Serial Number 2022-008424, filed Jan. 24, 2022, the disclosure of which is hereby incorporated by reference herein in its entirety.

BACKGROUND

1. Technical Field

The present disclosure relates to a dispensing device and a dispensing method.

2. Related Art

In a known method of dispensing a liquid sample, a pipette is used to dispense the liquid sample.

For example, International Publication No. WO2015/071956 describes a method of calibrating the amount of liquid to be discharged from a pipette. Specifically, the weight of liquid discharged from a pipette is measured to determine the amount of actually discharged liquid, and the amount of liquid to be discharged from the pipette is calibrated accordingly. In the method described in International Publication No. WO2015/071956, density obtained in advance with a densimeter or the like is used to convert the unit of the measured weight to volume.

The method described in International Publication No. WO2015/071956 is based on the premise that a liquid with a known density is handled. However, it is demanded that a liquid with a target weight can be accurately dispensed even when the density of the liquid is unknown.

SUMMARY

A dispensing device in an aspect of the present disclosure dispenses a liquid sample with a target weight x (in grams). The dispensing device includes:
  a pipette that discharges the liquid sample into a vessel; and
  a controller that controls the pipette.
The Controller Performs:
  first liquid discharge processing in which the controller discharges the liquid sample with a volume of $(x/\rho 0 \times y)$ milliliters (mL) into the pipette, where y is a numeric value greater than 0 and smaller than 1, and $\rho 0$ is the tentative density (in grams per mL) of the liquid sample;
  first weight acquisition processing in which the controller acquires information about the weight z (in grams) of the liquid sample discharged in the first liquid discharge processing;
  density calculation processing in which the controller calculates the density $\rho$ (in grams/mL) of the liquid sample according to the expression $\rho=z/(x/\rho 0 \times y)$; and
  second liquid discharge processing in which the controller discharges, into the pipette, the liquid sample with a volume based on the density $\rho$, the weight z, and the target weight x.

In a dispensing method in an aspect of the present disclosure, a liquid sample with a target weight x (in grams) is dispensed. The dispensing method includes:
  a first liquid discharge step of discharging the liquid sample with a volume of $(x/\rho 0 \times y)$ mL, where y is a numeric value greater than 0 and smaller than 1, and $\rho 0$ is the tentative density (in grams per mL) of the liquid sample;
  a weight measurement step of measuring the weight z (in grams) of the liquid sample discharged in the first liquid discharge step;
  a density calculation step of calculating the density $\rho$ of the liquid sample according to the expression $\rho=z/(x/\rho 0 \times y)$; and
  a second liquid discharge step of discharging the liquid sample with a volume based on the density $\rho$, the weight z, and the target weight x.

DESCRIPTION OF EXEMPLARY EMBODIMENTS

Preferred embodiments of the present disclosure will be described below in detail with reference to the drawings. The embodiments described below do not unreasonably restrict the contents of the present disclosure, the contents being described in the scope of claims. All of the structures described below are not always essential structural requirements in the present disclosure.

1. Dispensing Device

1.1 Overall structure

Figure 1:
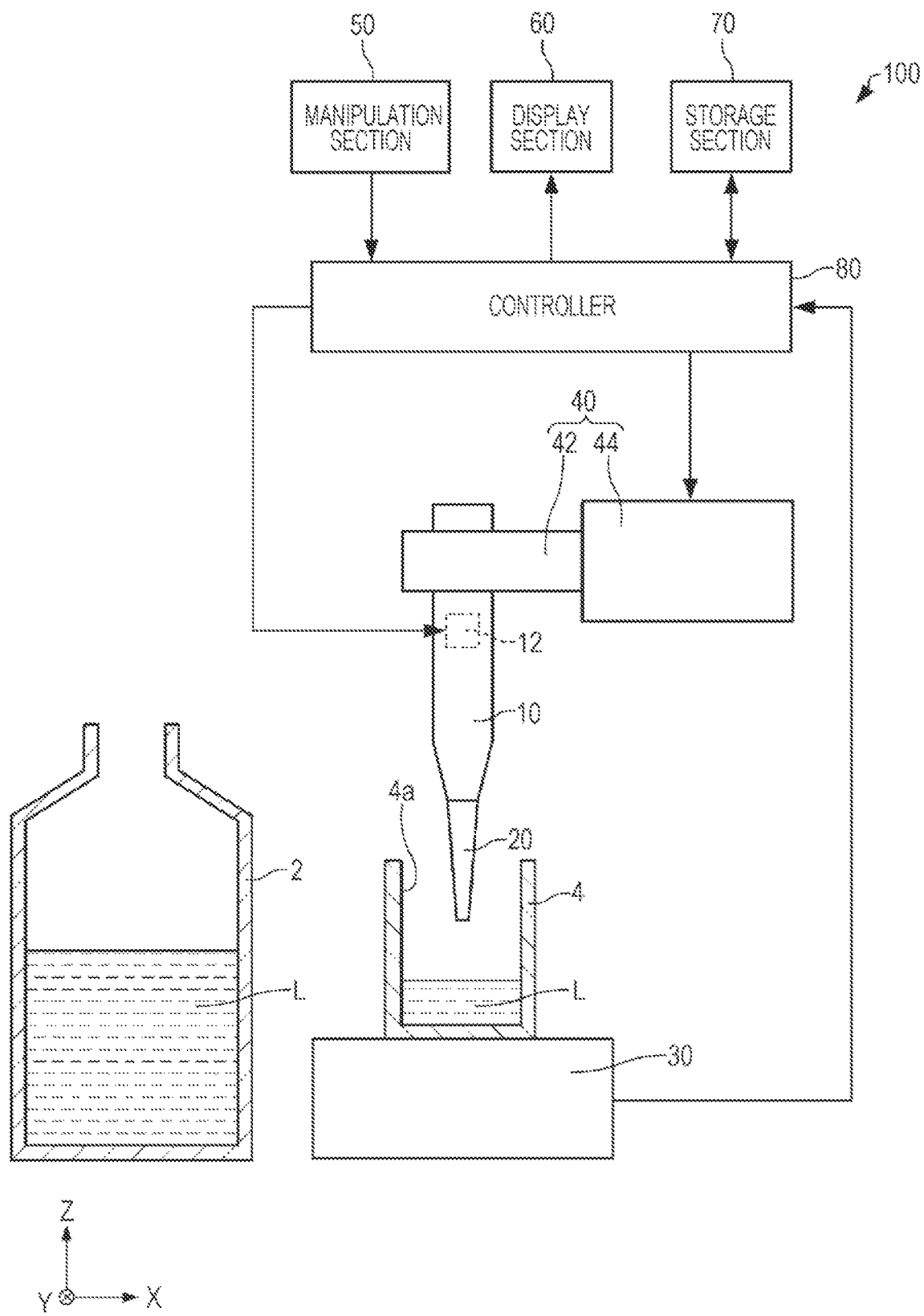
FIG. 1 illustrates a dispensing device according to an embodiment.

First, a dispensing device according to an embodiment will be described with reference to the drawings. FIG. 1 illustrates the dispensing device 100 according to the embodiment. In FIG. 1, the X-axis, Y-axis, and Z-axis are indicated as three axes that mutually orthogonal. The X-axis direction and Y-axis direction are, for example, horizontal directions. The Z-axis direction is, for example, the vertical direction.

The dispensing device 100 includes, for example, a pipette 10, a chip 20, a weightometer 30, a moving mechanism 40, a manipulation section 50, a display section 60, a storage section 70, and a controller 80, as illustrated in FIG. 1. The dispensing device 100 dispenses a liquid sample L with a target weight x (in grams).

The pipette 10 draws the liquid sample L from a reagent bottle 2 in which a liquid is held and discharges the drawn liquid sample L into a vessel 4. There is no particular limitation on the type of the liquid sample L as long as it can be drawn and discharged by the pipette 10.

The pipette 10 has, for example, a driving section 12 as well as a plunger and a cylinder, which are not illustrated. The driving section 12 is structured by, for example, including a stepping motor. When the driving section 12 is driven and the plunger thereby slides in the cylinder, the pipette 10 can draw and discharge the liquid sample L with a predetermined amount. The driving section 12 is controlled by the controller 80.

The pipette 10 is, for example, a micropipette. There is no particular limitation on the pipette 10 as long as it can draw and discharge the liquid sample L. However, the highly precise, lightweight electronic pipette "pipetty" from ICOMES LAB Co., Ltd., for example, is used.

The chip 20 is attached to the tip of the pipette 10. The pipette 10 draws and discharges the liquid sample L through the chip 20. A known chip for use for a pipette is used as the chip 20.

The weightometer 30 measures the weight of the liquid sample L discharged into the vessel 4. The vessel 4 is disposed on the weightometer 30. The vessel 4 is, for example, a beaker. The vessel 4 has an inside surface 4a. The inside surface 4a is the inner surface of the vessel 4. There is no particular limitation on the type of the weightometer 30 as long as it can measure the weight of the liquid sample L. However, an electronic scale, for example, is used. The weightometer 30 may be accommodated in a wind-resistant glass case (not illustrated).

The moving mechanism 40 relatively moves the pipette 10 and vessel 4. That is, the moving mechanism 40 changes the relative positions of the pipette 10 and vessel 4. The moving mechanism 40 further relatively moves the pipette 10 and reagent bottle 2. Specifically, the moving mechanism 40 relatively moves the pipette 10, reagent bottle 2, and vessel 4 in the X-axis direction, Y-axis direction, and Z-axis direction.

The moving mechanism 40 has, for example, an arm 42 and a driving section 44. The arm 42 extends from the driving section 44. The arm 42 supports the pipette 10. The driving section 44 is structured by including, for example, a motor, an electric actuator, and the like. When the driving section 44 is driven, the moving mechanism 40 relatively moves the pipette 10, reagent bottle 2, and vessel 4. The driving section 44 is controlled by the controller 80. In the example in the drawing, the moving mechanism 40 moves the pipette 10 with the reagent bottle 2 and vessel 4 fixed.

The reagent bottle 2 and vessel 4 may be supported by a support plate (not illustrated). Then, the moving mechanism 40 may move the support plate with the pipette 10 fixed to relatively move the pipette 10, reagent bottle 2 and vessel 4. Alternatively, the moving mechanism 40 may move the support plate and pipette 10 to relatively move the pipette 10, reagent bottle 2, and vessel 4. The support plate, pipette 10, chip 20, weightometer 30, and moving mechanism 40 may be accommodated in a case (not illustrated).

The manipulation section 50 is manipulated by the user. The manipulation section 50 transmits a signal to the controller 80 in response to a manipulation by the user. The manipulation section 50 is structured by including, for example, a mouse, a touch panel, a keyboard, and the like.

The display section 60 displays various images in response to commands from the controller 80. The display section 60 is structured by using, for example, a liquid crystal display (LCD), an organic electroluminescence (EL) display, an electrophoretic display (EPD), a touch panel display, or the like.

The storage section 70 stores, for example, programs and data used by the controller 80 to perform various types of calculation processing and control processing. Furthermore, the storage section 70 is used as a work area employed by the controller 80. Specifically, the storage section 70 temporarily stores, for example, information received from the weightometer 30 and results of calculations executed by the controller 80 according to various types of programs. The storage section 70 is structured by using, for example, a random-access memory (RAM) and a read-only memory (ROM).

The controller 80 performs various types of calculation processing and control processing according to programs stored in the storage section 70. The controller 80 controls the pipette 10 and moving mechanism 40. The controller 80 receives a signal from the weightometer 30 through a communication section (not illustrated). The controller 80 also transmits signals to the driving section 12 in the pipette 10 and to the driving section 44 in the moving mechanism 40 through the communication section (not illustrated).

The controller 80 is structured by including, for example, a central processing unit (CPU), a microprocessing unit (MPU), a digital signal processor (DSP), an application-specific integrated circuit (ASIC), and the like. The communication section is structured by including a transmitter/receiver complying with, for example, Bluetooth (registered trademark), Wi-Fi (registered trademark) meaning wireless fidelity, Zigbee (registered trademark), the near field communication (NFC) standard, or another wireless communication standard. However, the transmitter/receiver included in the communication section may comply with a wired communication standard.

1.2 Processing by the Controller

Figure 2:
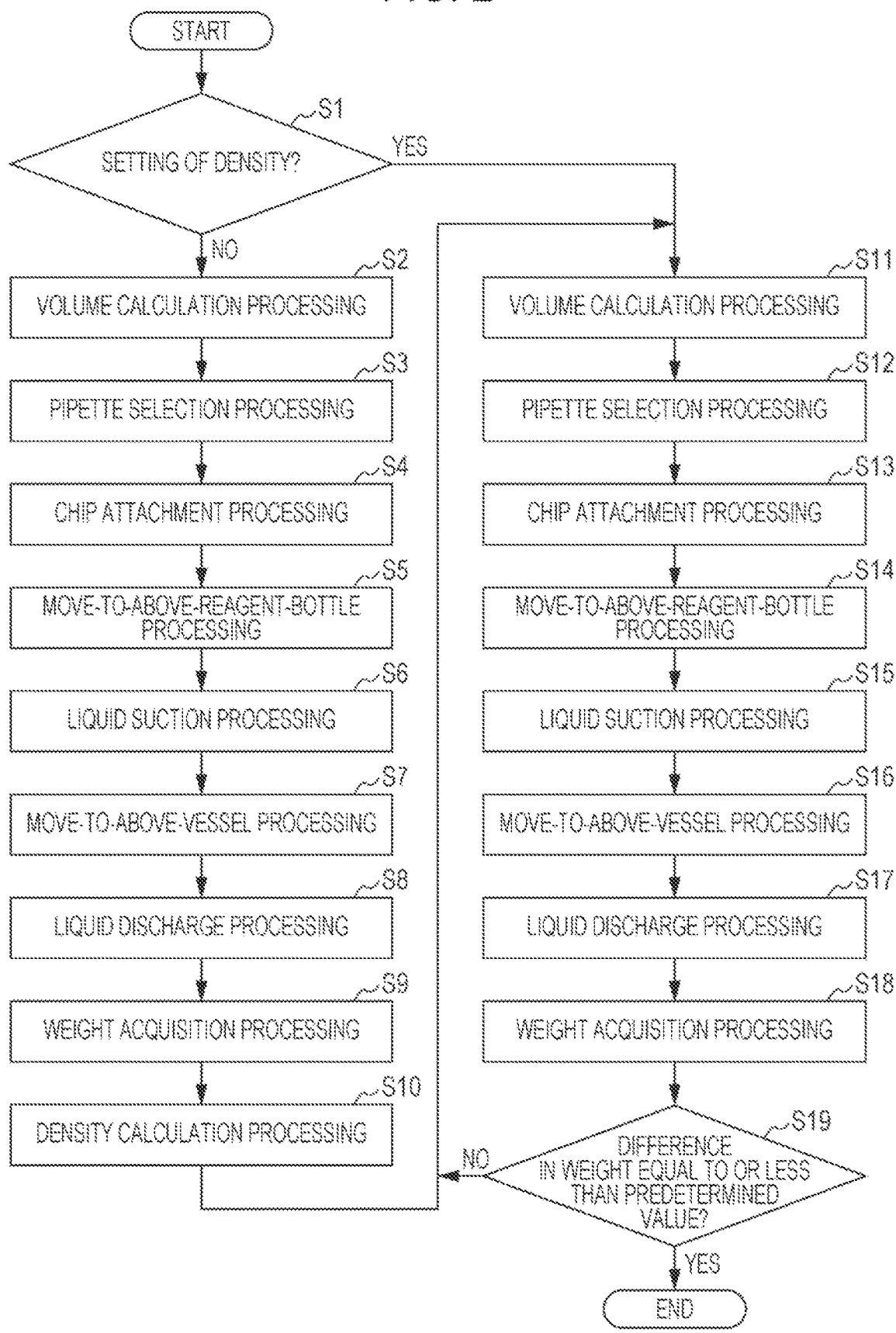
FIG. 2 is a flowchart illustrating processing by a controller in the dispensing device according to the embodiment.

FIG. 2 is a flowchart illustrating processing by the controller 80.

When the controller 80 receives a processing start signal issued from the manipulation section 50 in response to a manipulation by the user, the controller 80 starts processing. The processing start signal includes information about the target weight x (in grams) of the liquid sample L to be discharged into the vessel 4. The controller 80 stores the target weight x in the storage section 70.

The controller 80 performs decision processing in which the controller 80 decides whether the density of the liquid sample L has been set on the manipulation section 50, as illustrated in FIG. 2 (step S1).

Specifically, the user can use the manipulation section 50 to set the density of the liquid sample L. The manipulation section 50 functions as an acceptance section that accepts the setting of the density of the liquid sample L. When the manipulation section 50 accepts the setting of the density of the liquid sample L, the controller 80 stores information about the density of the liquid sample L in the storage section 70. In processing in step S1, the controller 80 decides whether information about the density of the liquid sample L is stored in the storage section 70.

When the controller 80 decides that the density of the liquid sample L has not been set (No in step S1), the controller 80 performs volume calculation processing in which the controller 80 calculates the volume of the liquid sample L to be drawn in step S6, which will be described later (step S2).

Specifically, the controller 80 calculates a volume of $(x/\rho 0 \times y)$ milliliters (mL), where y is a numeric value greater than 0 and smaller than 1, and $\rho 0$ is the tentative density (in grams per mL) of the liquid sample L. The tentative density $\rho 0$ of the liquid sample L is, for example, 1 g/mL. In this case, the controller 80 calculates a volume of $(x \times y)$ mL.

The user can use the manipulation section 50 to set the numeric value y. The manipulation section 50 functions as an acceptance section that accepts the setting of the numeric value y. When the manipulation section 50 accepts the setting of the numeric value y, the controller 80 stores information about the numeric value y in the storage section 70. In processing in step S2, the controller 80 decides whether information about the numeric value y is stored in the storage section 70. When information about the numeric value y is stored in the storage section 70, the controller 80 uses the stored numeric value y to calculates a volume. When information about the numeric value y is not stored in the storage section 70, the controller 80 calculates a volume, assuming that y is 0.5.

Next, the controller 80 performs pipette selection processing in which the controller 80 selects a pipette 10 to be used, according to the volume calculated in processing in step S2 (step S3).

Specifically, a plurality of pipettes 10 are prepared. A different pipette 10 has a different limited drawn volume. For example, four types of pipettes 10, the limited drawn volumes of which are 20 μL, 200 μL, 1 mL, and 10 mL, are prepared. The controller 80 selects a pipette 10 having a limited drawn volume that is equal to or greater than the calculated volume and is closest to the calculated volume. The volume of the liquid sample L drawn in one execution of liquid suction processing is smaller than the upper limit of the selected pipette 10. The controller 80 displays information about the selected pipette 10 on the display section 60.

The user attaches the selected pipette 10 to the arm 42 of the moving mechanism 40 according to the information displayed on the display section 60. After having attached the pipette 10 to the arm 42, the user manipulates the manipulation section 50 to transmits an attachment completion signal to the controller 80.

Upon receipt of the attachment completion signal, the controller 80 performs chip attachment processing in which the controller 80 controls the moving mechanism 40 to attach the chip 20 to the pipette 10 (step S4).

Specifically, the chip 20 is stored at a predetermined chip storage position. The controller 80 controls the moving mechanism 40 so that the pipette 10 is moved to the chip storage position, at which the controller 80 attaches the chip 20 to the pipette 10.

Next, the controller 80 performs move-to-above-reagent-bottle processing in which the controller 80 controls the moving mechanism 40 to place the chip 20 attached to the pipette 10 above the reagent bottle 2 (step S5).

Specifically, the controller 80 controls the moving mechanism 40 to move the pipette 10 so that the chip 20 is placed above the reagent bottle 2. In the example in FIG. 1, the term "above" refers to the +Z-axis direction.

Next, the controller 80 performs liquid suction processing in which the controller 80 controls the moving mechanism 40 to insert the chip 20 into the liquid sample L held in the reagent bottle 2, after which the controller 80 causes the pipette 10 to draw the liquid sample L by the volume calculated in processing in step S2 (step S6).

Specifically, the controller 80 controls the moving mechanism 40 to move the pipette 10 in the −Z axis direction so that the chip 20 is inserted into the liquid sample L held in the reagent bottle 2. Next, the controller 80 drives the driving section 12 in the pipette 10 to pull the plunger (not illustrated) in the +Z-axis direction so that the pipette 10 draws the liquid sample L by a predetermined volume. The controller 80 then controls the moving mechanism 40 to move the pipette 10 in the +Z-axis direction so that the chip 20 moves apart from the liquid sample L. Although not illustrated, the pipette 10 has a liquid surface sensor that detects the position of the liquid surface of the liquid sample L. The controller 80 may move the pipette 10 according to the result of detection by the liquid surface sensor.

Next, the controller 80 performs move-to-above-vessel processing in which the controller 80 controls the moving mechanism 40 to place the chip 20 attached to the pipette 10 above the vessel 4 (step S7).

Specifically, the controller 80 controls the moving mechanism 40 to move the pipette 10 so that the chip 20 is placed above the vessel 4. The controller 80 may move the pipette 10 according to the result of detection by the liquid surface sensor.

Next, the controller 80 performs liquid discharge processing in which the controller 80 discharges, into the pipette 10, the liquid sample L with the volume calculated in processing in step S2 (step S8).

Specifically, the controller 80 drives the driving section 12 in the pipette 10 to press the plunger (not illustrated) in the −Z-axis direction so that the liquid sample L with the volume drawn into the pipette 10 in processing in step S6 is discharged into the vessel 4. After driving the driving section 12 to press the plunger, for example, the controller 80 controls the moving mechanism 40 to bring the chip 20 and the inside surface 4a of the vessel 4 into contact with each other. Alternatively, the controller 80 may press the plunger in a state in which the chip 20 and inside surface 4a are in contact with each other.

Next, the controller 80 performs weight acquisition processing in which the controller 80 acquires information about the weight z (in grams) of the liquid sample L discharged into the vessel 4 in processing in step S8 (step S9). The controller 80 stores the acquired information about the weight in the storage section 70. After having acquired the information about the weight, the controller 80 may close the window of the wind-resistant glass case in which the weightometer 30 is accommodated.

Next, the controller 80 performs density calculation processing in which the controller 80 calculates the density ρ (g/mL) of the liquid sample L according to expression (1) below (step S10). The controller 80 stores the calculated density ρ in the storage section 70.

$$\rho = z/(x/\rho 0 \times y) \tag{1}$$

Next, the controller 80 performs volume calculation processing in which the controller 80 calculates the volume of the liquid sample L to be drawn in step S15, which will be described later, according to the density ρ of the liquid sample L, the density ρ having been calculated in processing in step S10, the sum Msum of the weight of the liquid sample L that has been discharged into the vessel 4 so far, and the target weight x (step S11). The controller 80 calculates the sum Msum from information about the weight, of the liquid sample L, that has been acquired so far.

Specifically, the controller 80 derives the volume by calculating ((x−Msum)/ρ). When, for example, the information about the weight, of the liquid sample L, that has been acquired so far includes only the weight z, of the liquid sample L, that has been acquired in processing in step S9, the sum Msum is z. Therefore, the controller 80 derives the volume by calculating ((x−z)/ρ).

When the controller 80 decides that the density of the liquid sample L has been set (Yes in step S1), the controller 80 derives the volume in processing in step S11 by calculating ((x−Msum)/ρ) according to the setting of the density ρ.

Next, the controller 80 performs pipette selection processing in which the controller 80 selects a pipette 10 to be used according to the volume calculated in processing in step S11 (step S12). Processing in step S12 is basically the same as processing in step S3 described above.

Next, the controller 80 performs chip attachment processing in which the controller 80 attaches the chip 20 to the pipette 10 (step S13). Processing in step S13 is basically the same as processing in step S4 described above. When the same pipette 10 as in processing in step S3 is selected in processing in step S12, the controller 80 skips processing in step S13.

Next, the controller 80 performs move-to-above-reagent-bottle processing in which the controller 80 controls the moving mechanism 40 to place the chip 20 attached to the pipette 10 above the reagent bottle 2 (step S14). Processing in step S14 is basically the same as processing in step S5 described above.

Next, the controller 80 performs liquid suction processing in which the controller 80 controls the moving mechanism 40 to insert the chip 20 into the liquid sample L held in the reagent bottle 2, after which the controller 80 causes the pipette 10 to draw the liquid sample L by the volume calculated in processing in step S11 (step S15). Processing in step S15 is basically the same as processing in step S6 described above.

Next, the controller 80 performs move-to-above-vessel processing in which the controller 80 controls the moving mechanism 40 to place the chip 20 attached to the pipette 10 above the vessel 4 (step S16). Processing in step S16 is basically the same as processing in step S7 described above.

Next, the controller 80 performs liquid discharge processing in which the controller 80 discharges, into the pipette 10, the liquid sample L with the volume calculated in processing in step S11 (step S17). Processing in step S17 is basically the same as processing in step S8 described above.

Next, the controller 80 performs weight acquisition processing in which the controller 80 acquires information about the weight w (in grams) of the liquid sample L discharged into the vessel 4 in processing in step S17 (step S18). Processing in step S18 is basically the same as processing in step S9 described above.

Next, the controller 80 performs decision processing in which the controller 80 calculates the sum Msum of the weight of the liquid sample L that has been discharged into the vessel 4 so far, and decides whether the difference between the sum Msum and the target weight x is equal to or less than a predetermined value (step S19). The controller 80 calculates the sum Msum from information about the weight, of the liquid sample L, that has been acquired so far.

When, for example, the information about the weight, of the liquid sample L, that has been acquired so far is a combination of information about the weight z acquired in processing in step S9 and information about the weight w acquired in processing in step S18, the controller 80 decides whether the difference between the sum (z+w) and the target weight x is equal to or less than the predetermined value.

When the controller 80 decides that the difference between the sum Msum and the target weight x is not equal to or less than the predetermined value (No in step S19), the controller 80 returns the process to step S11. Then, the controller 80 repeats processing in steps S11 to S19 until the controller 80 decides in step S19 that the difference between the sum Msum and the target weight x is equal to or less than the predetermined value. The controller 80 may execute liquid suction processing three times or more as described above. The predetermined value is set by the user.

When the controller 80 decides that the difference between the sum Msum and the target weight x is equal to or less than the predetermined value (Yes in step S19), the controller 80 displays, for example, the sum Msum and the difference between the sum Msum and the target weight x on the display section 60. Then, the controller 80 terminates the processing.

Decision processing in step S19 is not limited to the example described above. In step S19, the controller 80 may decide whether the sum Msum of the weight of the liquid sample L is equal to or greater than the target weight x, for example. When the controller 80 decides that the sum Msum of the weight of the liquid sample L is not equal to or greater than the target weight x, the controller 80 may repeat processing in steps S11 to S19 until the controller 80 decides that the sum Msum is equal to or greater than the target weight x. When the controller 80 decides that the sum Msum is equal to or greater than the target weight x, the controller 80 terminates the processing.

1.3 Effects

With the dispensing device 100, the controller 80 performs: first liquid discharge processing in which the controller 80 discharges the liquid sample L with a volume of (x/ρ0×y) mL into the pipette 10, where y is a numeric value greater than 0 and smaller than 1, and ρ0 is the tentative density (in grams per mL) of the liquid sample L; first weight acquisition processing in which the controller 80 acquires information about the weight z (in grams) of the liquid sample L discharged in first liquid discharge processing; density calculation processing in which the controller 80 calculates the density ρ (in grams/mL) of the liquid sample L according to the expression ρ=z/(x/ρ0×y); and second liquid discharge processing in which the controller 80 discharges, into the pipette 10, the liquid sample L with a volume based on the density ρ, weight z, and target weight x.

With the dispensing device 100, therefore, even when the density of the liquid sample L is unknown, the density of the liquid sample L can be calculated in first liquid discharge processing, first weight acquisition processing, and density calculation processing. This enables the liquid sample L with the target weight x to be accurately dispensed. In addition, since the liquid sample L is managed by weight, the influence of environment temperature can be lessened when compared with management by volume, making stable dispensing possible.

In second liquid discharge processing in the dispensing device 100, the controller 80 discharges the liquid sample L with a volume of ((x−z)/ρ) mL into the pipette 10. With the dispensing device 100, therefore, the liquid sample L with the target weight x can be more accurately dispensed.

With the dispensing device 100, the controller 80 performs: second weight acquisition processing in which the controller 80 acquires information about the weight w (in grams) of the liquid sample L that has been dispensed in second liquid discharge processing; decision processing in which the controller 80 decides whether the difference between the target weight x and the sum of the weight z and weight w is equal to or smaller than a predetermined value; and third liquid discharge processing in which when the controller 80 decides that the difference between the target weight x and the sum is equal to or smaller than the predetermined value, the controller 80 discharges, into the pipette 10, the liquid sample L with a volume based on the density ρ, weight z, weight w, and target weight x. With the dispensing device 100, therefore, the liquid sample L with the target weight x can be more accurately dispensed.

The dispensing device 100 includes the manipulation section 50, which functions as an acceptance section that accepts the setting of the density of the liquid sample L. When the density of the liquid sample L is not set on the manipulation section 50, the controller 80 performs first liquid discharge processing, first weight acquisition processing, and density calculation processing. With the dispensing device 100, therefore, when the density is known, first liquid discharge processing, first weight acquisition processing, and density calculation processing can be omitted. This enables the controller 80 to speed up processing.

The dispensing device 100 includes the manipulation section 50, which functions as an acceptance section that accepts the setting of the numeric value y. The controller 80 performs first liquid discharge processing according to the numeric value y set on the manipulation section 50. With the dispensing device 100, therefore, even when the density of the liquid sample L is great (equal to or greater than 2 g/mL), the liquid sample L with the target weight x can be accurately dispensed. Assuming that the tentative density ρ0 is 1 g/mL and y is 0.5, when the density of the liquid sample L is 2 g/mL or greater, the liquid sample L with a weight of the target weight x or more is discharged in liquid discharge processing in step S8. When the setting of the numeric value y is accepted, however, this type of problem can be avoided.

The dispensing device 100 includes the moving mechanism 40 that relatively moves the pipette 10 and vessel 4. The controller 80 performs: first movement processing in which the controller 80 controls the moving mechanism 40 before first liquid discharge processing so that the chip 20 attached to the pipette 10 is placed above the vessel 4; and second movement processing in which the controller 80 controls the moving mechanism 40 after first liquid discharge processing but before second liquid discharge processing so that the chip 20 is placed above the vessel 4. With the dispensing device 100, therefore, the pipette 10 and vessel 4 can be relatively and automatically moved.

With the dispensing device 100, the controller 80 controls the moving mechanism 40 in first liquid discharge processing and second liquid discharge processing so that the chip 20 and the inside surface 4a of the vessel 4 are brought into contact with each other. Therefore, the dispensing device 100 can reduce the amount of liquid sample L remaining in the chip 20.

With the dispensing device 100, the tentative density ρ0 is 1 g/mL. Therefore, the dispensing device 100 can easily calculate the volume of the liquid sample L to be discharged in first liquid discharge processing.

2. Dispensing Method

Next, a dispensing method according to an embodiment will be described.

In the dispensing method according to this embodiment, a liquid sample with the target weight x (in grams) is dispensed. The dispensing method according to this embodiment includes: a first liquid discharge step of discharging the liquid sample L with a volume of $(x/\rho0 \times y)$ mL, where y is a numeric value greater than 0 and smaller than 1, and ρ0 is the tentative density (in grams per mL) of the liquid sample L; a weight measurement step of measuring the weight z (in grams) of the liquid sample L discharged in the first liquid discharge step; a density calculation step of calculating the density ρ of the liquid sample L according to expression (1) described above; and a second liquid discharge step of discharging the liquid sample L with a volume based on the density ρ, weight z, and target weight x. The dispensing method according to this embodiment is executed by, for example, using the dispensing device 100 described above.

The embodiments described are just examples. The present disclosure is not limited to these embodiments. For example, the embodiments can also be appropriately combined.

The present disclosure includes substantially the same structure as a structure described in the embodiments, the same structure being, for example, a structure having the same function, method and result or having the same object and effects as described in the embodiments. The present disclosure also includes a structure in which a portion that is not essential to a structure described in the embodiments is replaced. The present disclosure also includes a structure that has the same effects as the effects of a structure described in the embodiments or a structure that can achieve the same object as the object of a structure described in the embodiments. The present disclosure also includes a structure in which a known technology is added to a structure described in the embodiments.

The following can be derived from the embodiments described above.

A dispensing device in an aspect dispenses a liquid sample with a target weight x (in grams). The dispensing device includes:
  a pipette that discharges the liquid sample into a vessel; and
  a controller that controls the pipette.

The Controller Performs:
  first liquid discharge processing in which the controller discharges the liquid sample with a volume of $(x/\rho0 \times y)$ mL into the pipette, where y is a numeric value greater than 0 and smaller than 1, and ρ0 is the tentative density (in grams per mL) of the liquid sample;
  first weight acquisition processing in which the controller acquires information about the weight z (in grams) of the liquid sample discharged in the first liquid discharge processing;
  density calculation processing in which the controller calculates the density ρ (in grams/mL) of the liquid sample according to the expression $\rho = z/(x/\rho0 \times y)$; and
  second liquid discharge processing in which the controller discharges, into the pipette, the liquid sample with a volume based on the density ρ, the weight z, and the target weight x.

With this dispensing device, a liquid sample with a target weight can be accurately dispensed.

In the dispensing device in another aspect, the controller may discharge the liquid sample with a volume of $((x-z)/\rho)$ mL into the pipette in the second liquid discharge processing.

With this dispensing device, a liquid sample with a target weight can be more accurately dispensed.

In the dispensing device in another aspect, the controller may perform:
  second weight acquisition processing in which the controller acquires information about the weight w (in grams) of the liquid sample that has been dispensed in second liquid discharge processing;
  decision processing in which the controller decides whether the difference between the target weight x and the sum of the weight z and the weight w is equal to or smaller than a predetermined value; and
  third liquid discharge processing in which when the controller decides that the difference between the target weight x and the sum is equal to or smaller than the predetermined value, the controller discharges, into the pipette, the liquid sample with a volume based on the density ρ, the weight z, the weight w, and the target weight x.

With this dispensing device, a liquid sample with a target weight can be more accurately dispensed.

The dispensing device in another aspect may include an acceptance section that accepts the setting of the density of the liquid sample. When the density of the liquid sample is not set by the acceptance section, the controller may perform the first liquid discharge processing, the first weight acquisition processing, and the density calculation processing.

With this dispensing device, when the density is known, the controller can speed up processing.

The dispensing device in another aspect may include an acceptance section that accepts the setting of the numeric value y. The controller may perform the first liquid discharge processing according to the numeric value y set by the acceptance section.

With this dispensing device, even when the density of the liquid sample is great, a liquid sample with a target weight can be accurately dispensed.

The dispensing device in another aspect may include a moving mechanism that relatively moves the pipette and the vessel. The controller may perform:

first movement processing in which the controller controls the moving mechanism before the first liquid discharge processing so that a chip attached to the pipette is placed above the vessel; and second movement processing in which the controller controls the moving mechanism after the first liquid discharge processing but before the second liquid discharge processing so that the chip is placed above the vessel.

With this dispensing device, the pipette and vessel can be relatively and automatically moved.

In the dispensing device in another aspect, the controller may control the moving mechanism in the first liquid discharge processing and in the second liquid discharge processing so that the chip and the inside surface of the vessel are brought into contact with each other.

With this dispensing device, the amount of liquid sample remaining in the chip can be reduced.

In the dispensing device in another aspect, the tentative density $\rho 0$ may be 1 g/mL.

With this dispensing device, the volume of a liquid sample discharged in first liquid to be discharge processing can be easily calculated.

In a dispensing method in an aspect, a liquid sample with a target weight x (in grams) is dispensed. The dispensing method includes:

a first liquid discharge step of discharging the liquid sample with a volume of $(x/\rho 0 \times y)$ mL, where y is a numeric value greater than 0 and smaller than 1, and $\rho 0$ is the tentative density (in grams per mL) of the liquid sample;

a weight measurement step of measuring the weight z (in grams) of the liquid sample discharged in the first liquid discharge step;

a density calculation step of calculating the density $\rho$ of the liquid sample according to the expression $\rho = z/(x/\rho 0 \times y)$; and a second liquid discharge step of discharging the liquid sample with a volume based on the density $\rho$, the weight z, and the target weight x.

In the dispensing method in another aspect, the liquid sample with a volume of $((x-z)/\rho)$ mL may be discharged in the second liquid discharge processing.

In the dispensing method in another aspect, the liquid sample may be dispensed from a pipette into a vessel in the first liquid discharge step and in the second liquid discharge step; and the chip attached to the pipette and the inside surface of the vessel may be brought into contact with each other in the first liquid discharge step and in the second liquid discharge step.

What is claimed is:

1. A dispensing device that dispenses a liquid sample with a target weight x (in grams), the device comprising:

a pipette that discharges the liquid sample into a vessel; and a controller that controls the pipette; wherein the controller performs first liquid discharge processing in which the controller discharges the liquid sample with a volume of $(x/\rho 0 \times y)$ milliliters (mL) into the pipette, where y is a numeric value greater than 0 and smaller than 1, and $\rho 0$ is a tentative density (in grams per mL) of the liquid sample, first weight acquisition processing in which the controller acquires information about a weight z (in grams) of the liquid sample discharged in the first liquid discharge processing, density calculation processing in which the controller calculates a density $\rho$ (in grams/mL) of the liquid sample according to an expression $\rho = z/(x/\rho 0 \times y)$, and second liquid discharge processing in which the controller discharges, into the pipette, the liquid sample with a volume based on the density $\rho$, the weight z, and the target weight x.

2. The dispensing device according to claim 1, wherein the controller discharges the liquid sample with a volume of $((x-z)/\rho)$ mL into the pipette in the second liquid discharge processing.

3. The dispensing device according to claim 1, wherein the controller performs:

second weight acquisition processing in which the controller acquires information about a weight w (in grams) of the liquid sample that was dispensed in second liquid discharge processing;

decision processing in which the controller decides whether a difference between the target weight x and a sum of the weight z and the weight w is equal to or smaller than a predetermined value; and third liquid discharge processing in which when the controller decides that the difference between the target weight x and the sum is equal to or smaller than the predetermined value, the controller discharges, into the pipette, the liquid sample with a volume based on the density $\rho$, the weight z, the weight w, and the target weight x.

4. The dispensing device according to claim 1, further comprising an acceptance section that accepts a setting of the density of the liquid sample, wherein when the density of the liquid sample is not set by the acceptance section, the controller performs the first liquid discharge processing, the first weight acquisition processing, and the density calculation processing.

5. The dispensing device according to claim 1, further comprising an acceptance section that accepts a setting of the numeric value y, wherein the controller performs the first liquid discharge processing according to the numeric value y set by the acceptance section.

6. The dispensing device according to claim 1, further comprising a moving mechanism that relatively moves the pipette and the vessel, wherein the controller performs:

first movement processing in which the controller controls the moving mechanism before the first liquid discharge processing so that a chip attached to the pipette is placed above the vessel; and second movement processing in which the controller controls the moving mechanism after the first liquid discharge processing but before the second liquid discharge processing so that the chip is placed above the vessel.

7. The dispensing device according to claim 6, wherein the controller controls the moving mechanism in the first liquid discharge processing and in the second liquid discharge processing so that the chip and the inside surface of the vessel are brought into contact with each other.

8. The dispensing device according to claim 1, wherein the tentative density ρ0 is 1 g/mL.

9. A method of dispensing a liquid sample with a target weight x (in grams), the method comprising:
- a first liquid discharge step of discharging the liquid sample with a volume of (x/ρ0×y) milliliters (mL), where y is a numeric value greater than 0 and smaller than 1, and ρ0 is a tentative density (in grams per mL) of the liquid sample;
- a weight measurement step of measuring a weight z (in grams) of the liquid sample discharged in the first liquid discharge step;
- a density calculation step of calculating a density ρ of the liquid sample according to an expression ρ=z/(x/ρ0×y); and
- a second liquid discharge step of discharging the liquid sample with a volume based on the density ρ, the weight z, and the target weight x.

10. The method according to claim 9, wherein the liquid sample with a volume of ((x−z)/ρ) mL is discharged in the second liquid discharge processing.

11. The method according to claim 9, wherein:
- the liquid sample is dispensed from a pipette into a vessel in the first liquid discharge step and in the second liquid discharge step; and
- a chip attached to the pipette and an inside surface of the vessel are brought into contact with each other in the first liquid discharge step and in the second liquid discharge step.

* * * * *